(12) United States Patent
Riedel, Jr. et al.

(10) Patent No.: US 11,549,546 B2
(45) Date of Patent: Jan. 10, 2023

(54) NUT FOR FLUID JOINT ASSEMBLY HAVING THREAD TERMINUS LOCATED FOR CRACKING PREVENTION

(71) Applicant: Caterpillar Inc., Peoria, IL (US)

(72) Inventors: Robert E. Riedel, Jr., Fox River Grove, IL (US); Peter Allan Manos, McHenry, IL (US)

(73) Assignee: Caterpillar Inc., Peoria, IL (US)

( * ) Notice: Subject to any disclaimer, the term of this patent is extended or adjusted under 35 U.S.C. 154(b) by 460 days.

(21) Appl. No.: 16/804,821

(22) Filed: Feb. 28, 2020

(65) Prior Publication Data

US 2021/0270308 A1   Sep. 2, 2021

(51) Int. Cl.
*F16B 37/16* (2006.01)
*F16L 19/02* (2006.01)

(52) U.S. Cl.
CPC .......... *F16B 37/16* (2013.01); *F16L 19/0231* (2013.01)

(58) Field of Classification Search
CPC . F16B 37/16; F16B 33/02; F16L 19/02; F16L 19/025
USPC ...................................... 411/435, 409, 366.1
See application file for complete search history.

(56) References Cited

U.S. PATENT DOCUMENTS

| 4,188,178 | A | * | 2/1980 | Anscher | F16B 37/16 |
| | | | | | 425/468 |
| 4,813,109 | A | * | 3/1989 | McCully | F16B 35/02 |
| | | | | | 24/276 |
| 6,557,577 | B1 | | 5/2003 | Corte, Jr. et al. | |
| 7,568,874 | B2 | * | 8/2009 | Riedel | F16B 23/0061 |
| | | | | | 411/935 |
| 8,408,605 | B2 | | 4/2013 | Curtiss | |
| 8,657,547 | B2 | | 2/2014 | Herndon | |
| 9,261,215 | B2 | * | 2/2016 | Kieper | F16L 47/04 |
| 10,184,597 | B2 | * | 1/2019 | Freed | E21B 17/0423 |
| 11,384,873 | B2 | * | 7/2022 | Acosta | F16L 19/02 |
| 2015/0226355 | A1 | | 8/2015 | Ungchusri et al. | |
| 2015/0362106 | A1 | * | 12/2015 | Laughlin | F16B 7/182 |
| | | | | | 411/517 |
| 2016/0377207 | A1 | | 12/2016 | Witkowski et al. | |
| 2022/0107041 | A1 | * | 4/2022 | Cheng | F16L 33/224 |

FOREIGN PATENT DOCUMENTS

CN    208503696 U    2/2019

* cited by examiner

*Primary Examiner* — Flemming Saether

(57) ABSTRACT

A nut for joining fluid conduits in a joint assembly includes a nut body having an inner body surface forming a throughbore, for supporting a first fluid conduit and a second fluid conduit. Internal threads upon the inner body surface advance in a helical path around a nut center axis between a thread origin, and a thread terminus that is located between first and second axial end faces of the nut body. At least one of the thread terminus and the thread origin is located within an increased thickness region formed by a varied radial thickness of the nut. The nut has a reduced risk of cracking in service.

20 Claims, 3 Drawing Sheets

NUT FOR FLUID JOINT ASSEMBLY HAVING THREAD TERMINUS LOCATED FOR CRACKING PREVENTION

TECHNICAL FIELD

The present disclosure relates generally to fluid joint assemblies, and more particularly to a nut for joining fluid conduits in a fluid joint assembly having internal threads originating or terminating at locations in the nut that are resistant to cracking.

BACKGROUND

Various industries require robust equipment for fluid handling, notably the oil and gas industry where fluid hydrocarbon materials and liquids used in extraction of such materials are pumped and transferred at high fluid pressures. Hydraulic fracturing, for example, typically involves elevating a pressure of a fracking fluid with pumps and injecting the highly pressurized fluid into subsurface strata to fracture the underlying rocks. Concrete pouring, gas compression, and other fluid conveyance applications can similarly involve pressurization and transfer of fluids that are highly viscous and/or highly pressurized. Conduits, typically metal pipes or the like, used in such applications can experience high absolute pressures, cyclic loads, and otherwise harsh conditions. Hardware used to couple together pipes or the like in these applications are typically designed for high resistance to failure. Threaded nuts, often equipped with projecting rings or lugs, are used to connect adjacent pipe sections, with the rings or lugs providing contact surfaces for tools such as a sledge that is hand operated, or tools that are hydraulically operated, to enable application of loads necessary for tightening or removal.

The harsh conditions in these and other applications can result in service life limitation upon nuts and related components. In addition to the stresses resulting from the conveyance of fluids, application of loads to tighten or loosen the nuts can themselves also create or exacerbate failure risk. For these reasons engineers are continually searching for improvements in resistance to fatigue or impact-produced cracking or the like. One example design of a wing nut for fluid transfer applications is known from WIPO Publication No. 2016/205208 to Witkowski.

SUMMARY OF THE INVENTION

In one aspect, a fluid joint assembly includes a fluid conduit having an inner conduit surface defining a conduit center axis extending between a first axial conduit end and a second axial conduit end. The fluid joint assembly further includes a nut for joining the fluid conduit to a second fluid conduit, and including a nut body having an outer body surface, and an inner body surface. The inner body surface defines a nut center axis and forms a through-bore extending between a first axial end face and a second axial end face. The fluid joint assembly also includes internal threads formed on the inner body surface and advancing in a helical path around the nut center axis between a thread origin, and a thread terminus located between the first axial end face and the second axial end face. The outer body surface has a tool-engagement profile, such that a radial thickness of the nut body is varied to form, circumferentially around the nut center axis, a plurality of reduced thickness regions in an alternating pattern with a plurality of increased thickness regions. At least one of the thread origin or the thread terminus is within one of the plurality of increased thickness regions.

In another aspect, a nut for joining fluid conduits in a joint assembly includes a nut body having an outer body surface, and an inner body surface defining a nut center axis extending between a first axial end face and a second axial end face of the nut body. The inner body surface forms a through-bore, for supporting a first fluid conduit and a second fluid conduit in an end-to-end arrangement, and includes internal threads advancing in a helical path around the nut center axis between a thread origin, and a thread terminus located between the first axial end face and the second axial end face. The outer body surface includes a tool-engagement profile, such that a radial thickness of the nut body is varied to form, circumferentially around the nut center axis, a plurality of reduced thickness regions in an alternating pattern with a plurality of increased thickness regions. The thread terminus is located within one of the plurality of increased thickness regions.

In still another aspect, a nut for joining fluid conduits in a joint assembly includes a nut body having an outer body surface, and an inner body surface defining a nut center axis extending between a first axial end face and a second axial end face of the nut body. The inner body surface forms a through-bore, for supporting a first fluid conduit and a second fluid conduit in an end-to-end arrangement, and includes internal threads advancing in a helical path around the nut center axis between a thread origin and a thread terminus. The outer body surface includes a plurality of circumferential transition surfaces in an alternating arrangement with a plurality of outer faces spaced radially outward relative to the plurality of circumferential transition surfaces. A material thickness of the nut body is varied, based upon the radially outward spacing of the plurality of outer faces, between reduced thickness regions and increased thickness regions, such that a crack-sensitivity of the nut body is varied congruously with the varying of the material thickness. At least one of the thread origin or the thread terminus is located within one of the increased thickness regions.

DETAILED DESCRIPTION

Figure 1:
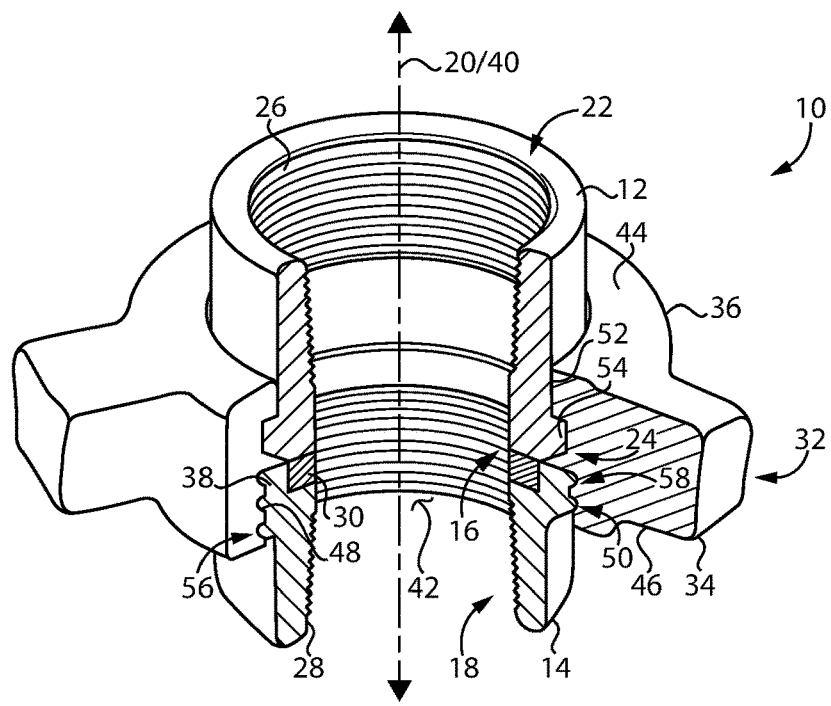
FIG. 1 is a sectioned diagrammatic view, in two section planes, of a fluid joint assembly, according to one embodiment.

Referring to FIG. 1, there is shown a fluid joint assembly 10 according to one embodiment. Fluid joint assembly 10 includes a first fluid conduit 12 having an inner conduit surface 16 defining a conduit center axis 20 extending between a first axial conduit end 22 and a second axial conduit end 24. Fluid joint assembly 10 may also include a second fluid conduit 14 having an inner conduit surface 18. Internal threads 26 are formed on inner conduit surface 16, and internal threads 28 are formed on inner conduit surface 18. First fluid conduit 12 and second fluid conduit 14 are in an end-to-end arrangement in fluid joint assembly 10, and a sealing gland 30 is positioned axially between first fluid conduit 12 and second fluid conduit 14. Fluid joint assembly 10 further includes a nut 32 for joining first fluid conduit 12 to second fluid conduit 14, having a nut body 34 with an outer body surface 36, and an inner body surface 38. Inner body surface 38 defines a nut center axis 40 and forms a through-bore 42 extending between a first axial end face 44 and a second axial end face 46 of nut body 34, for supporting first fluid conduit 12 and second fluid conduit 14 in the end-to-end arrangement. Fluid joint assembly 10 can be deployed in any of a variety of pumping and/or fluid transfer applications, and is contemplated to provide advantages in particular in high pressure applications such as fluid pressurization or transfer in oil and gas industries, although the present disclosure is not thereby limited. As will be further apparent from the following description, fluid joint assembly 10 can be expected to have increased crack resistance compared to certain known strategies.

In the illustrated embodiment, first fluid conduit 12 includes internal threads 26 structured to attach first fluid conduit 12 to another incoming or outgoing fluid conduit, and second fluid conduit 14 includes internal threads 28 for connecting to yet another incoming or outgoing fluid conduit. Either of first fluid conduit 12 or second fluid conduit 14 could fluidly connect to a pumping mechanism, a pressure vessel, a valve, or other fluid handling equipment. Moreover, one or both of first fluid conduit 12 and second fluid conduit 14 could include external threads in addition to or instead of the illustrated internal threads for connecting with additional equipment not shown in FIG. 1. Still other connecting mechanisms such as flanges or the like could be provided on first fluid conduit 12 and second fluid conduit 14 for such attachment purposes. As used herein, the plural term "threads" should be understood to refer to a single thread, or multiple threads.

Figure 2:
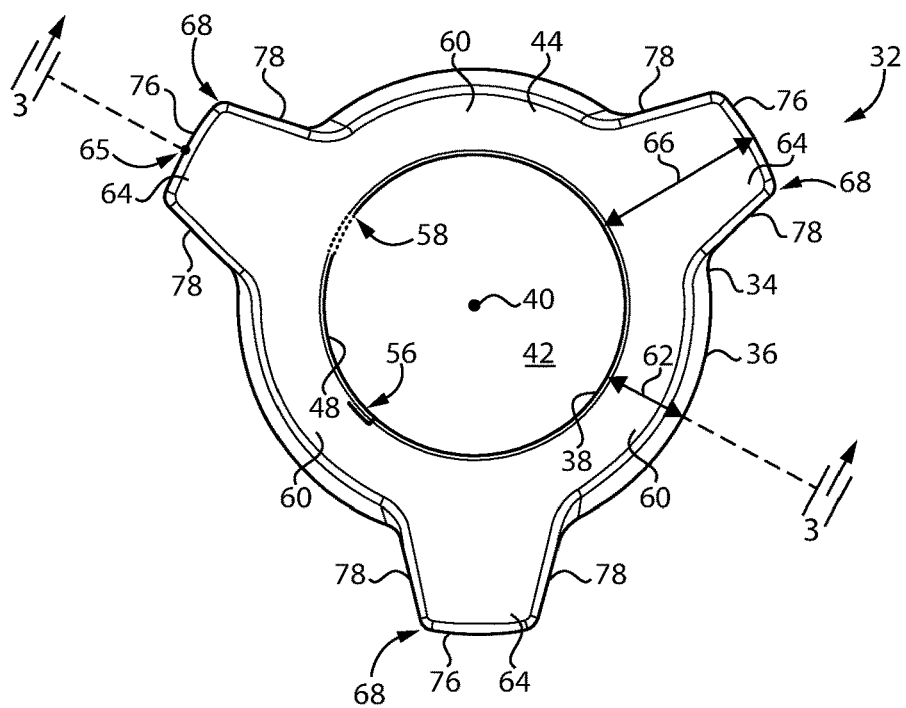
FIG. 2 is a top elevational view of a nut, according to one embodiment.
Figure 3:
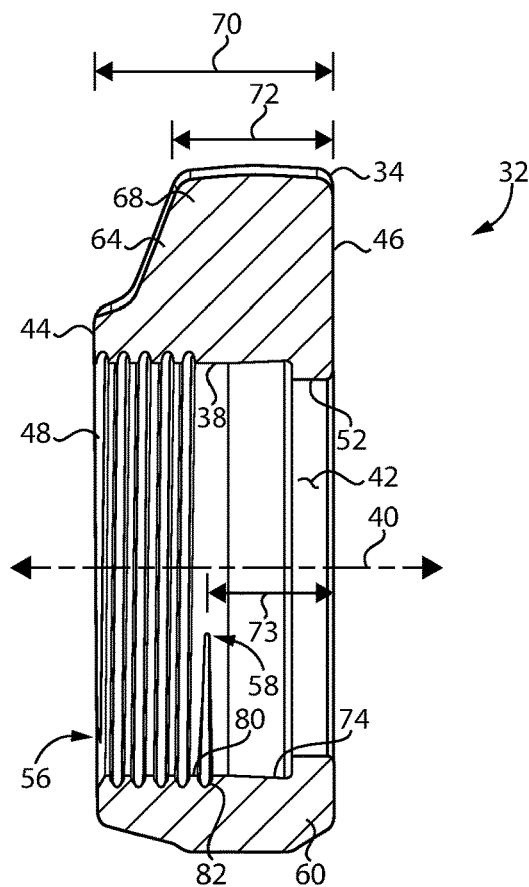
FIG. 3 is a sectioned view taken along line 3-3 of FIG. 2.
Figure 4:
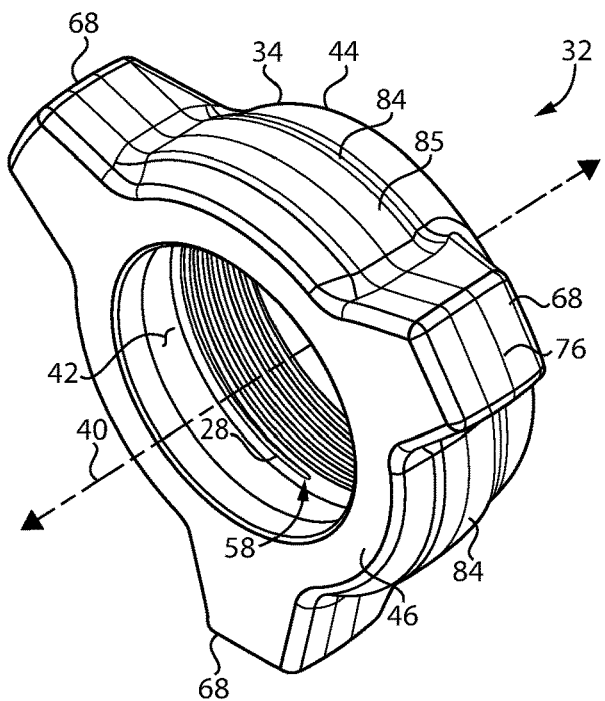
FIG. 4 is an isometric view of the nut of FIG. 2.

Nut 32 further includes internal threads 48 formed on inner body surface 38 and advancing in a helical path around nut center axis 40 between a thread origin 56, and a thread terminus 58 located between first axial end face 44 and second axial end face 46. Thread terminus 58 may include an endpoint of a thread valley, formed in inner body surface 38, but might include an endpoint of a thread peak or ridge in other embodiments. Referring also now to FIGS. 2-4, outer body surface 36 has a tool-engagement profile, such that a radial thickness of nut body 34 is varied to form, circumferentially around nut center axis 40, a plurality of reduced thickness regions 60 in an alternating pattern with a plurality of increased thickness regions 64. Reduced thickness regions 60 may define a reduced radial thickness 62, and increased thickness regions 64 may define an increased radial thickness 66. Reduced radial thickness 62 might be approximately 50% of increased radial thickness 66, and more broadly might be from approximately 25% to approximately 75% of increased radial thickness 66. The present disclosure is also not limited in this regard, however, and those skilled in the art will contemplate a variety of other configurations of tool-engagement profiles having relatively greater or relatively lesser variation, or different patterns of variation, in radial thickness. A circular outer surface profile would not be understood to be a tool-engagement profile as contemplated herein. At least one of thread origin 56 or thread terminus 58 is within one of the plurality of increased thickness regions 64, and in the illustrated embodiment thread terminus 58 is located within the one of the plurality of increased thickness regions 64, and thread origin 56 is located within one of the plurality of reduced thickness regions 60.

Also in the illustrated embodiment nut body 34 includes a plurality of tool strike wings 68 forming the plurality of increased thickness regions 64. Each of tool strike wings 68 may include an outer wing face 76 facing a radially outward direction, and a pair of strike faces 78 extending inwardly from the respective outer wing face 76 such that each of the plurality of tool strike wings 68 forms a trapezoidal profile. Other profiles such as square, rectangular, lobed, triangular, or still others might be employed. During assembly or installation of fluid joint assembly 10, a technician can employ a hand-operated hammer or sledge, a hydraulic hammer, a hydraulic wrench, or another suitable tool to contact strike faces 78 to rotate nut 32 about nut center axis 40, and press first fluid conduit 12 and second fluid conduit 14 together, compressing sealing gland 30 where used, and otherwise clamping first fluid conduit 12 and second fluid conduit axially together in the end-to-end arrangement. For disassembly or deinstallation, a technician can suitably apply an impact or other rotational load upon one of more of strike faces 78 in a generally opposite manner.

As shown in FIG. 3, nut body 34 may have an axial body thickness 70 extending between first axial end face 44 and second axial end face 46. Each of the plurality of tool strike wings 68 may have an axial wing thickness 72 that is less than axial body thickness 70. Also shown in FIG. 3 is a spacing distance 73 from thread terminus 58 to second axial end face 46. Spacing distance 73 may be less than axial wing thickness 72. An approximate axial location of thread terminus 58 may be at a longitudinal half-way point between first axial end face 44 and second axial end face 46, however, the present disclosure is also not limited in this regard. Nut body 34 may further include an inner clamping shoulder 52, projecting radially inward. First fluid conduit 12 can be seen in FIG. 1 to include an outer clamping shoulder 54 in contact with inner clamping shoulder 52. Second fluid conduit 14 includes external threads 50 in mated engagement with internal threads 48. The present disclosure contemplates any suitable arrangement of shoulders and threads upon first fluid conduit 12, second fluid conduit 14, and nut 32 that enables rotation of nut 32 about nut center axis 40 to increase a clamping force or decrease a clamping force upon first fluid conduit 12 and second fluid conduit 14. An unthreaded inner bore surface 74 extends axially between inner clamping shoulder 52 and thread terminus 58. Unthreaded inner bore surface 74 may include an inwardly stepped profile between thread terminus 58 and second axial end face 46 so as to form inner clamping shoulder 52.

It is further contemplated that threads upon nut body 34 may have any suitable thread configuration. In a practical implementation, internal threads 48 include thread peaks 80 and thread valleys 82. It will be recalled that internal threads 48 may include, and typically will include, a single continuous thread. Accordingly, thread peaks 80 may include a single continuous peak and thread valleys 82 may include a single continuous valley. Internal threads 48 are arcuate shaped, in the illustrated embodiment, such that thread valleys 82 are curvilinear in longitudinal profile as depicted in FIG. 3, but in other embodiments could be trapezoidal, square, or another shape. Thread peaks 80 may be squared off so as to have linear longitudinal profiles.

Outer body surface 36 may be further understood to include a plurality of circumferential transition surfaces 84 in an alternating arrangement with the plurality of outer wing faces 76. Outer wing faces 76 are spaced radially outward relative to the plurality of circumferential transition surfaces 84. Each of circumferential transition surfaces 84 may form a radially projecting circumferential rib 85 extending circumferentially between adjacent ones of tool strike wings 68 in some embodiments, as depicted in FIG. 4. Nut body 34 may be formed of a metallic material such as a forged or cast iron or steel material, with the material thickness of nut body 34 being varied, based upon the radially outward spacing of the plurality of outer wing faces 76, between reduced thickness regions 60 and increased thickness regions 64. Based on the varied material thickness, a crack-sensitivity of nut body 34 is varied congruously with the varying of the material thickness. This principal can be understood to mean that a susceptibility of nut body 34 to cracking may be relatively higher in reduced thickness regions 60 versus relatively lower in increased thickness regions 64. By appropriately locating thread terminus 58, and in some embodiments thread origin 56, resistance of nut 32 to cracking in service or during assembly or disassembly of fluid joint assembly 10 can be reduced as compared to known designs.

In one embodiment, thread terminus 58 is substantially aligned, circumferentially, with a longitudinal centerline 65 of one of the plurality of outer wing faces 76, as shown in FIG. 2. Other embodiments could include a different alignment of thread terminus 58 relative to a longitudinal centerline of outer wing faces 76. In the illustrated embodiment, tool strike wings 68 are substantially symmetrical, circumferentially around nut center axis 40. In other embodiments, tool strike wings 68 could have non-symmetrical configurations, and thread terminus 58 might be shifted to locate where relatively more material is available for crack-resistance based on shapes of tool strike wings 68. Still other nut configurations could justify locating thread terminus 58 at still other relative positions based not only upon the structure of the nut, but also upon the in-service loads expected to be experienced, or loads expected to be experienced during assembly or disassembly. In the illustrated embodiment, thread terminus 58 is centered, in a circumferential direction, within one of increased thickness regions 64. Thread terminus 58 may also be centered, longitudinally, between first axial end face 44 and second axial end face 46. Nut body 34 may also have a total of three tool strike wings each including one of outer wing faces 76 and two of strike faces 78. In other embodiments a total of two strike wings, or a number of strike wings greater than three might be provided.

Figure 5:
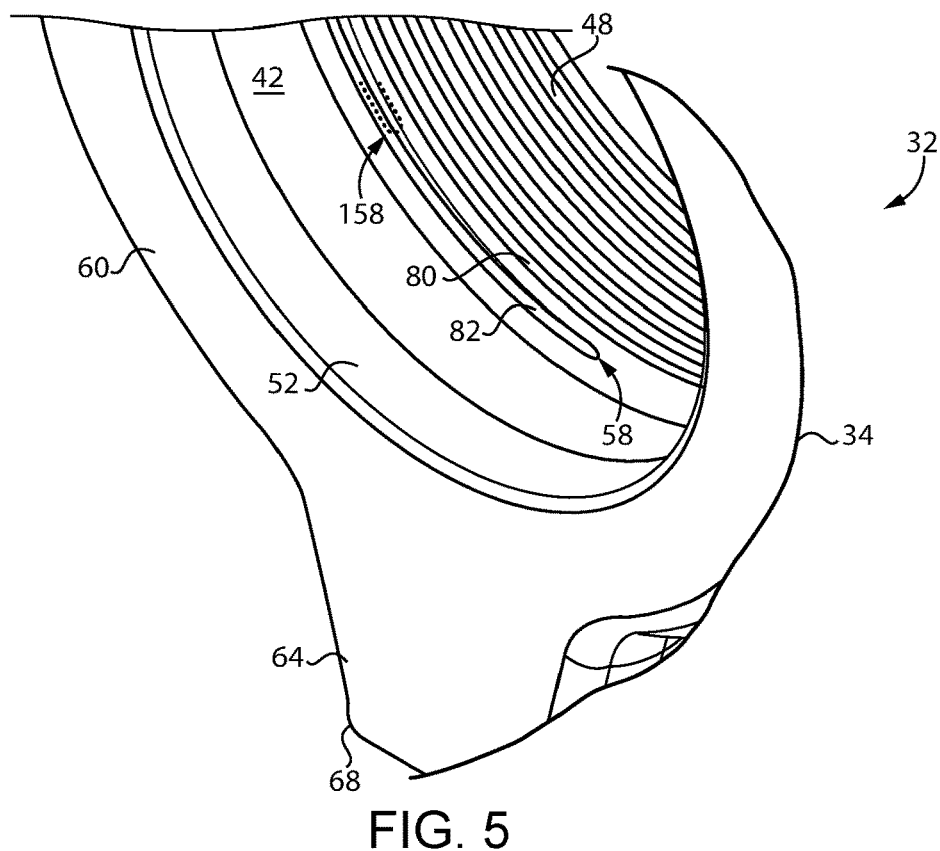
FIG. 5 is a detail view showing a portion of the nut as in FIGS. 2-4.

Referring now to FIG. 5, there is shown a detailed view of nut 32, showing the location of thread terminus 58 in comparison to a thread terminus location 158 that might be observed in known nuts. It can be seen that known thread terminus location 158 would be understood to reside in a decreased thickness region, whereas thread terminus 58 is in the increased thickness regions. It can also be noted that thread terminus 58 is formed adjacent to unthreaded inner bore surface 74. It has been observed that the geometric transition between a region where threads are cut into a surface and an unthreaded region can be associated with stress concentrations. Axial loads, bending loads imparted by bending forces upon joined fluid conduits in service, or other factors, can result in a thread terminus location serving as a point of crack initiation and propagation, typically in a radially outward direction through the material of the nut. It will be understood that in the case of a nut employing thread terminus 158 less material exists in a radially outward direction to diffuse or otherwise accommodate stress, whereas in the case of the present disclosure the greater amount of material in a radially outward direction allows greater diffusion and management of stress and reduced risk of crack initiation and propagation.

Figure 6:
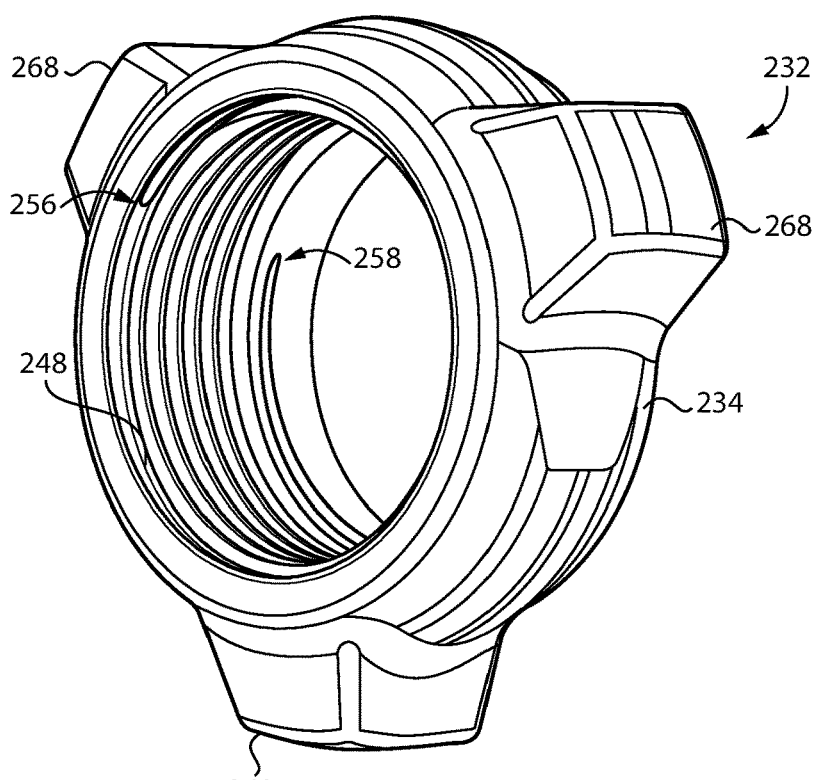
FIG. 6 is an isometric view of a nut, according to another embodiment.

Turning to FIG. 6, there is shown a nut 232 according to another embodiment, and including a nut body 234 having internal threads 248 structured to clamp together fluid conduits in an end-to-end arrangement analogous to that of the foregoing embodiment. Nut 232 includes a plurality of tool strike wings 268, again generally analogous to the foregoing embodiment, and resulting in an increased material thickness in an alternating arrangement with a reduced material thickness. Nut 232 differs from the foregoing embodiment in that a thread origin 256 and a thread terminus 258 are both aligned with one of tool strike wings 268, and thus formed in an increased thickness region of nut body 234. In alternative embodiments only thread origin 256 might be within an increased thickness region, or thread origin 256 and thread terminus 258 might each be located within an increased thickness region but located within different increased thickness regions from one another. The description herein of any one embodiment should be understood to refer by way of analogy to any other embodiment except where otherwise indicated or apparent from context.

INDUSTRIAL APPLICABILITY

Referring to the drawings generally, during installation and assembly of fluid joint assembly 10 first fluid conduit 12 can be slid through through-bore 42 until such point that outer clamping shoulder 54 and inner clamping shoulder 52 contact one another, to set relative axial locations of first fluid conduit 12 and nut 32. Second fluid conduit 14 can then be coupled with nut 32, such as by engaging external threads 50 with internal threads 48, and rotating nut 32 until such point that the respective axial ends of fluid conduit 12 and second fluid conduit 14 abut.

Nut 32 can then be further rotated, such as by striking one or more of tool strike wings 68 to axially clamp first fluid conduit 12 and second fluid conduit 14 together. During service, fluid joint assembly 10 can be expected to experience high cyclic pressures, such as from pumping of fluids, and may also convey fluids having relatively great viscosity. So-called pull-out forces, concentrated at thread terminus 58 will produce material stresses in the material of nut 32, however, the relatively larger amount of material based upon the location of thread terminus 58 as discussed herein can be expected to advantageously manage the stresses so as to prevent cracking or excessive material fatigue.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fluid joint assembly comprising:
a first fluid conduit including an inner conduit surface defining a conduit center axis extending between a first axial conduit end and a second axial conduit end;
a nut for joining the first fluid conduit to a second fluid conduit, and including a nut body having an outer body surface, and an inner body surface, the inner body surface defining a nut center axis and forming a through-bore extending between a first axial end face and a second axial end face;
internal threads formed on the inner body surface and advancing in a helical path around the nut center axis between a thread origin and a thread terminus located between the first axial end face and the second axial end face,
wherein the nut body includes an inner clamping shoulder, and an unthreaded inner bore surface extends axially between the inner clamping shoulder and the thread terminus;
the outer body surface having a tool-engagement profile, such that a radial thickness of the nut body is varied to form, circumferentially around the nut center axis, a plurality of reduced thickness regions in an alternating pattern with a plurality of increased thickness regions; and
at least one of the thread origin or the thread terminus is within one of the plurality of increased thickness regions.

2. The fluid joint assembly of claim 1 wherein the nut body includes a plurality of tool strike wings forming the plurality of increased thickness regions.

3. The fluid joint assembly of claim 2 wherein:
the nut body has an axial body thickness extending between the first axial end face and the second axial end face; and
each of the plurality of tool strike wings has an axial wing thickness that is less than the axial body thickness.

4. The fluid joint assembly of claim 1 wherein the thread terminus is located within the one of the plurality of increased thickness regions.

5. The fluid joint assembly of claim 1 wherein the first fluid conduit includes an outer clamping shoulder in contact with the inner clamping shoulder.

6. The fluid joint assembly of claim 5 wherein the second fluid conduit is supported in the through-bore, the second fluid conduit including external threads engaged with the internal threads so as to clamp the first fluid conduit in contact with the second fluid conduit in an end-to-end arrangement.

7. The fluid joint assembly of claim 2 wherein the nut body includes a total of three tool strike wings.

8. A nut for joining fluid conduits in a joint assembly comprising:
a nut body having an outer body surface, and an inner body surface defining a nut center axis extending between a first axial end face and a second axial end face of the nut body;
the inner body surface forming a through-bore, for supporting a first fluid conduit and a second fluid conduit in an end-to-end arrangement, and including internal threads advancing in a helical path around the nut center axis between a thread origin and a thread terminus located between the first axial end face and the second axial end face,
wherein the inner body surface includes an unthreaded inner bore surface extending axially between the thread terminus and the second axial end face of the nut body,
wherein the unthreaded inner bore surface has an inwardly stepped profile between the thread terminus and the second axial end face so as to form an inner shoulder;
the outer body surface having a tool-engagement profile, such that a radial thickness of the nut body is varied to form, circumferentially around the nut center axis, a plurality of reduced thickness regions in an alternating pattern with a plurality of increased thickness regions; and
the thread terminus is located within one of the plurality of increased thickness regions.

9. The nut of claim 8 wherein the nut body includes a plurality of tool strike wings forming the plurality of increased thickness regions.

10. The nut of claim 9 wherein each of the plurality of tool strike wings includes an outer wing face facing a radially outward direction, and a pair of strike faces extending inwardly from the respective outer wing face such that each of the plurality of tool strike wings forms a trapezoidal profile.

11. The nut of claim 10 wherein the thread terminus is substantially aligned, circumferentially, with a longitudinal centerline of one of the plurality of outer wing faces.

12. The nut of claim 9 wherein the nut body includes a total of three tool strike wings.

13. The nut of claim 8 wherein thread valleys of the internal threads are curvilinear in longitudinal profile.

14. A nut for joining fluid conduits in a joint assembly comprising:
a nut body having an outer body surface, and an inner body surface defining a nut center axis extending between a first axial end face and a second axial end face of the nut body;
the inner body surface forming a through-bore, for supporting a first fluid conduit and a second fluid conduit in an end-to-end arrangement, and including internal threads advancing in a helical path around the nut center axis between a thread origin and a thread terminus;
the outer body surface including a plurality of circumferential transition surfaces in an alternating arrangement with a plurality of outer faces spaced radially outward relative to the plurality of circumferential transition surfaces,
wherein the nut body includes a plurality of tool strike faces each extending between one of the plurality of circumferential transition surfaces and one of the plurality of outer faces,
wherein the nut body includes a total of three tool strike wings each including one of the plurality of outer faces, and two of the plurality of tool strike faces;
a material thickness of the nut body is varied, based upon the radially outward spacing of the plurality of outer faces, between reduced thickness regions and increased thickness regions, such that a crack-sensitivity of the nut body is varied congruously with the varying of the material thickness; and
at least one of the thread origin or the thread terminus is located within one of the increased thickness regions.

15. The nut of claim 14 wherein the inner body surface includes an unthreaded inner bore surface extending axially between the thread terminus and the second axial end face of the nut body.

16. The nut of claim 15 wherein the unthreaded inner bore surface has an inwardly stepped profile between the thread terminus and the second axial end face so as to form an inner clamping shoulder.

17. The nut of claim 14 wherein the thread terminus is centered, in a circumferential direction, within the one of the increased thickness regions.

18. A nut for joining fluid conduits in a joint assembly comprising:

a nut body having an outer body surface, and an inner body surface defining a nut center axis extending between a first axial end face and a second axial end face of the nut body;

the inner body surface forming a through-bore, for supporting a first fluid conduit and a second fluid conduit in an end-to-end arrangement, and including internal threads advancing in a helical path around the nut center axis between a thread origin and a thread terminus, wherein the inner body surface includes an unthreaded inner bore surface extending axially between the thread terminus and the second axial end face of the nut body, wherein the unthreaded inner bore surface has an inwardly stepped profile between the thread terminus and the second axial end face so as to form an inner clamping shoulder;

the outer body surface including a plurality of circumferential transition surfaces in an alternating arrangement with a plurality of outer faces spaced radially outward relative to the plurality of circumferential transition surfaces;

a material thickness of the nut body is varied, based upon the radially outward spacing of the plurality of outer faces, between reduced thickness regions and increased thickness regions, such that a crack-sensitivity of the nut body is varied congruously with the varying of the material thickness; and at least one of the thread origin or the thread terminus is located within one of the increased thickness regions.

19. The nut of claim 18 wherein the nut body includes a plurality of tool strike wings forming the increased thickness regions.

20. The nut of claim 19 wherein the nut body includes a total of three tool strike wings.

* * * * *